United States Patent [19]
Schubert

[11] Patent Number: 5,688,481
[45] Date of Patent: Nov. 18, 1997

[54] METHOD FOR PRODUCING CALCIUM BORATE

[75] Inventor: David M. Schubert, Los Angeles, Calif.

[73] Assignee: U.S. Borax Inc., Valencia, Calif.

[21] Appl. No.: 544,518

[22] Filed: Oct. 18, 1995

[51] Int. Cl.$^6$ .................................................. C01B 35/12
[52] U.S. Cl. ................................................ 423/279; 423/280
[58] Field of Search ...................................... 423/279, 280

[56] References Cited

U.S. PATENT DOCUMENTS

| | | |
|---|---|---|
| 3,032,391 | 5/1962 | Ball et al. . |
| 3,032,392 | 5/1962 | Nies et al. . |
| 3,337,292 | 8/1967 | Wieder et al. . |
| 3,337,293 | 8/1967 | Wieder et al. . |
| 4,179,493 | 12/1979 | Sadan ........................ 423/279 |
| 4,233,051 | 11/1980 | Eastes . |
| 4,683,126 | 7/1987 | Inoue et al. ................. 423/280 |

FOREIGN PATENT DOCUMENTS

| | | | |
|---|---|---|---|
| 71300 | 6/1976 | Japan | ...................... 423/279 |
| 27923 | 2/1982 | Japan | ...................... 423/279 |
| 1321678 | 7/1987 | U.S.S.R. . | |
| 1754656 | 8/1992 | U.S.S.R. . | |

OTHER PUBLICATIONS

Ditte, Production par voie seche de quelques borates crystallises, Acad. Sci. Paris Comptes rendus, vol. 77, pp. 783–785 (1873) (with translation).

Erd et al., Nobleite, Another New Hydrous Calcium Borate From the Death Valley Region, Calif., American Mineralogist, vol. 46, pp. 560–571 (1961).

Lehmann et al., "Uber Bildungs und Existenzbedingungen von Gowerit, $CaB_6O_{10}$· 5 $H_2O$, und Nobleit, $CaB_6O_{10}$·4 $H_2O$, sowie ihre, Umwandlung in $Ca_3B_{20}O_{33}$·12 $H_2O$". Zeitschrift fur Anorganische und Allgemeine Chemie, Band 346, pp. 12–20 (1966).

Lehman, et al., Chemical Abstracts vol. 65, 14808 (1966).

Kemp, "The Chemistry of Borates", 1956, pp. 68–71, Borax Consolidated Limited, London, S.W.L.

Mellor, "Supplement to Mellor's Comprehensive Treatise on Inorganic and Theoretical Chemistry", vol. V, Part A, pp. 550–551 (1980).

Meyerhoffer et al., Liebig's Ann., 351, pp. 100–107 (1907).

Meyerhoffer et al., Chemical Abstracts, vol. 1, 1236 (1907).

Van't Hoff, J. H. (1907), Untersuchungen uber die Bildung der ozeanischen Salzablagerungen. LI. Borocalcit und die kunstliche Darstellung von Ascharit: Sitzungsber. Konigl.

Van't Hoff, Chemical Abstracts, vol. 1, 2864 (1907).

Sborgi, Umberto (1913), Sistema $CaO–B_2O_3–H_2O$ a 30°: Atti. Accad. Lincei, 5th ser., 22, pp. 636–642, 715–719, 798–801.

Sborgi, Chemical Abstracts, vol. 7, 3092 (1913).

Nikolaev, A. V. and Chelishcheva, A. G. (1940), The 25° isotherm of the systems: $CaO+B_2O_3+H_2O$ and $MgO+B_2O_3+H_2O$: Comptes rendus (Doklady) Acad. Sci. U.R.S.S., 28, 127–130.

Lehmann et al., "Uberdie Hydratedes Calcium (1:1) borates $Ca(BO_2)_2·6H_2O$ und $Ca(BO_2)_2·4H_2O$", Zeitschriftfur Anorganische und Allgemeine Chemie, Band 320, pp. 255–260 (1963).

*Primary Examiner*—Wayne A. Langel
*Attorney, Agent, or Firm*—James R. Thornton

[57] ABSTRACT

An improved method is provided for producing crystalline calcium hexaborate tetrahydrate, synthetic nobleite, by the reaction of boric acid and lime in an aqueous slurry. Reaction conditions include boric acid to water molar ratios of greater than 0.25:1, lime to boric acid molar ratios in the range of 0.05–0.15:1 and temperatures in the range of 85°–105° C. A novel crystalline product is produced having a unique crystal habit resulting in improved physical properties. Dehydration of this product produced a novel amorphous, anhydrous product having similar crystal habit and physical properties.

15 Claims, 1 Drawing Sheet

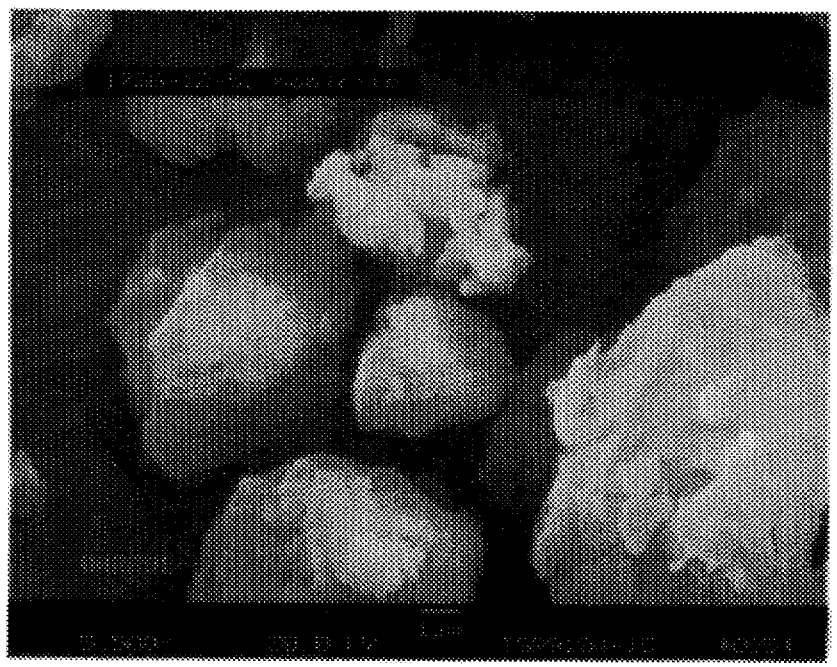
FIG. 1
FIG. 2
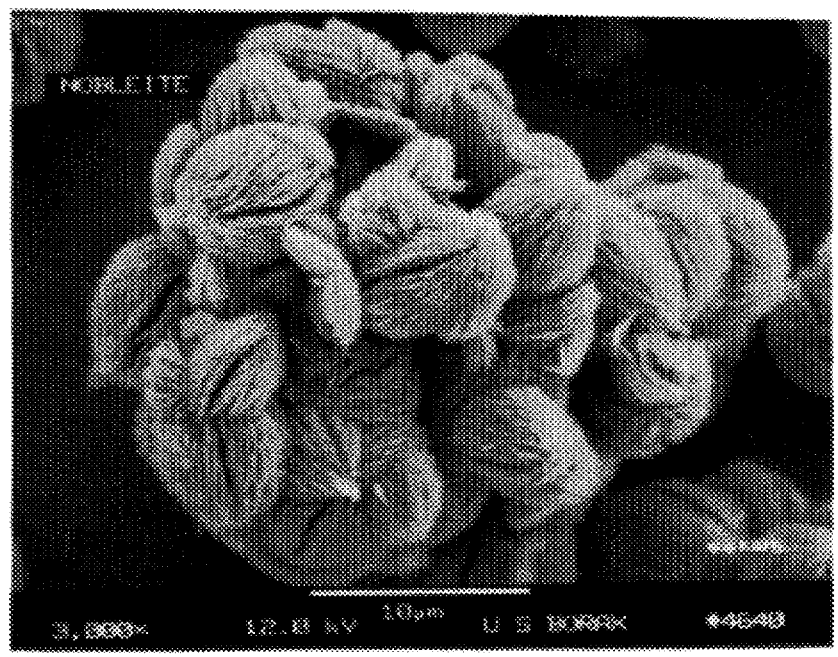

METHOD FOR PRODUCING CALCIUM BORATE

This invention relates to a method for the production of calcium borate and more particularly to an improved method for producing crystalline calcium hexaborate tetrahydrate, a synthetic form of the mineral nobleite, by the reaction of boric acid and lime in an aqueous slurry.

BACKGROUND OF THE INVENTION

Calcium borates have many industrial applications. They are used as a source of boron in fiberglass manufacture when the desired glass composition requires that sodium addition be limited, such as for textile fiberglass. They are also useful as fire retardant agents in such materials as plastics and rubber polymers, cellulosics, resins and oils, etc. Further, they are useful in the manufacture of steel and ceramics.

Many different calcium borate compositions are known, both natural and synthetic; they are most commonly formed as hydrated compounds. Naturally occurring calcium borates which are commonly used commercially include colemanite, which has the chemical composition $2CaO \cdot 3B_2O_3 \cdot 5H_2O$, and ulexite, a mixed sodium-calcium borate of the composition $Na_2O \cdot 2CaO \cdot 5B_2O_3 \cdot 16H_2O$. Disadvantages of these naturally occurring calcium borate minerals include the presence of mineral impurities, the need for fine grinding when very fine particle sizes are needed, such as to achieve fine dispersions in polymeric resins for fire retardant applications, and in the case of ulexite, the presence of sodium and substantial water content. The borate contents of colemanite and ulexite are about 51% $B_2O_3$ and 43% $B_2O_3$, respectively.

Known synthetic calcium borates include the tetrahydrate and hexahydrate forms of calcium metaborate, $CaO \cdot B_2O_3 \cdot 4H_2O$ and $CaO \cdot B_2O_3 \cdot 6H_2O$, which contain about 35% and 30% $B_2O_3$, respectively. Although these synthetic compositions have the potential of being of higher purity, since they lack the mineral impurities found in naturally occurring colemanite and ulexite, they are relatively low in borate content by comparison. Synthetic gowerite, consisting of calcium hexaborate pentahydrate ($CaO \cdot 3B_2O_3 \cdot 5H_2O$), contains about 59% $B_2O_3$, which is substantially higher in borate content than the calcium metaborate compositions. However, gowerite tends to crystallize in a coarse, granular form, thus requiring grinding to achieve the fine particle sizes needed for many applications.

Calcium hexaborate tetrahydrate, which has the formula $CaO \cdot 3B_2O_3 \cdot 4H_2O$, has the same ratio of boron to calcium as synthetic gowerite, but contains less water. At 62% $B_2O_3$ it has a higher borate content than gowerite, the calcium metaborates and the minerals colemanite and ulexite. It is known to occur in nature as the mineral nobleite, although it is not found in commercially exploitable quantities.

Various methods for producing synthetic forms of the minerals nobleite and gowerite are known. For example synthetic nobleite can be produced by the hydrothermal treatment of meyerhofferite ($2CaO \cdot 3B_2O_3 \cdot 7H_2O$) in boric acid solution for 8 days at 85° C. See U.S. Pat. No. 3,337,292.

Ditte, *Acad. Sci. Paris Coptes rendus*, 77, 783–785 (1873), described the formation of lime borates by reaction of Iceland spar (calcite) with a saturated boric acid solution. The resultant salt was described as small needles of "a hydrated lime borate" which contains "$3BoO^2$, CaO and 4HO, which can be written as ($2BoO^2$, CaO, HO)($BoO^2$, 3HO)." Subsequently, Erd, McAllister and Vlisidis, *American Mineralogist*, 46,560–571 (1961), suggested the Ditte product was nobleite. Erd et at. also synthesized nobleite by stirring CaO and boric acid in water for 30 hours at 48° C., and then holding the product at 68° C. for 10 days.

Kemp, *The Chemistry of Borates, Part I*, page 70 (1956), reported that an aqueous solution of boric acid kept at 40° C. for 3 weeks deposits a mixture of $CaO \cdot 3B_2O_3 \cdot 4H_2O$ and $2CaO \cdot 3B_2O_3 \cdot 9H_2O$. Kemp also reported that $CaO \cdot 3B_2O_3 \cdot 8H_2O$ decomposes to form $CaO \cdot 3B_2O_3 \cdot 4H_2O$. According to *Supplement to Mellor's Comprehensive Treatise on Inorganic and Theoretical Chemistry, Volume V, Part A: Boron-Oxygen Compounds*, pages 550–551 (1980), $CaO \cdot 3B_2O_3 \cdot 4H_2O$ occurs as a solid phase in the systems $Na_2O$—CaO—$B_2O_3$—$H_2O$ and CaO—NaCl—$B_2O_3$—$H_2O$ at 25° C. and pH 5.5–6.5. Hydrothermal treatment of meyerhofferite in boric acid solution at 85–250° C. produced crystals of both the tetrahydrate and pentahydrate together with ginerite ($2CaO \cdot 7B_2O_3 \cdot 8H_2O$).

Mellor further reported that nobleite is a stable phase in the $CaO \cdot B_2O_3$—$H_2O$ system at 25° C. and at 45° C. and is also formed from an aqueous mixture of lime (CaO) and boric acid at 60° C. Also, Mellor reports on page 551 that $CaO \cdot 3B_2O_3 \cdot 5H_2O$ (gowerite) is formed from lime and boric acid in aqueous media at 100° C.

Lehmann et al, *Zeitshrift fur Anorganische und Allgemeine Chemie*, Volume 346, pages 12–20, (1966), teach that the formation of gowerite from CaO, $H_3BO_3$ and water is favored by a relatively high temperature (100° C.), and higher CaO concentration, whereas nobleite formation is predominantly formed in more dilute solutions with lower CaO content and at lower temperature (60° C.).

In contrast to the teachings of the art, it has been discovered that the reaction of boric acid and lime in an aqueous mixture at high temperature will produce nobleite instead of gowerite provided that the reactants, and boric acid in particular, are present at sufficiently high concentration in the reaction slurry, and the molar ratio of lime to boric acid ($CaO:H_3BO_3$) added is within specific limits.

SUMMARY OF THE INVENTION

This invention provides an improved method for producing a crystalline calcium hexaborate tetrahydrate, by the reaction of boric acid and lime in an aqueous slurry at a temperature in the range of from about 85° to 105° C., wherein the molar ratio of boric acid to water ($H_3BO_3:H_2O$) is greater than about 0.25:1 and the molar ratio of lime to boric acid ($CaO:_3BO_3$) is in the range of from about 0.05 to about 0.15:1. The method of this invention results in a rapid reaction rate, high product yield and favorable product characteristics such as fine particle size distribution, rapid filtration and good flow and bulk handling properties. Further, there is provided a novel crystalline calcium hexaborate tetrahydrate composition having a distinctive crystal habit.

DRAWINGS

FIG. 1 is a photomicrograph of calcium hexaborate tetrahydrate produced at low temperature (approximately 22° C.). FIG. 2 is a photomicrograph of calcium hexaborate tetrahydrate produced at high temperature (approximately 95° C.) by the improved method of this invention.

DETAILED DESCRIPTION OF THE INVENTION

The method of this invention comprises reacting high concentrations of boric acid and lime in water at high temperature, such as in the range of about 85° to about 105° C., to form crystalline calcium hexaborate tetrahydrate. The preferred reaction temperatures are near the boiling point of the slurry, and preferably in the range of from about 95° to about 101° C.

The concentration of the reactants is important to the production of calcium hexaborate tetrahydrate according to the process of this invention. In particular, a high ratio of boric acid to water in the reaction mixture will produce nobleite rather than gowerite at the high temperature conditions of this invention. Boric acid, which is highly soluble in water at high temperatures, should be added in quantities which are substantially greater than the solubility limit, in order to produce nobleite at these temperatures. The molar ratio of boric acid to water ($H_3BO_3:H_2O$) in the starting mixture should be greater than about 0.25:1, such as in the range of from about 0.25 to 0.5:1 and preferably in the range of from about 0.3 to 0.45:1. This is substantially higher than the solubility limit of boric acid at temperatures of 80° to 100° C. which ranges from about 0.07 to about 0.11 moles of $H_3BO_3$ per mole of water.

The molar ratio of lime to boric acid ($CaO:_3BO_3$) in the starting mixture is in the range of from about 0.05 to 0.15:1, and preferably about 0.1 to 0.13:1. As used herein, lime includes calcium oxide such as burnt lime and quick lime, calcium hydroxide such as hydrated lime, slaked lime and lime hydrate, and calcium carbonate, including calcite and limestone.

It appears to be beneficial to have a high concentration of undissolved solids in the reaction mixture such as would provide at least 25% by weight undissolved solids in the final product slurry and preferably at least 30% by weight. If the solids concentration is too low, this may lead to the formation of gowerite instead of the desired nobleite.

The method of this invention may be used in producing calcium hexaborate tetrahydrate in a batch, continuous or semi-continuous process. In a batch process, the boric acid and lime may be combined in water and heated at the required temperature range to initiate the reaction. Alternatively, a mother liquor recycled from previous runs or freshly prepared mother liquor may be used as the reaction media. In a continuous or semi-continuous process, the desired product is continuously removed from the reaction vessel and the remaining mother liquor is recycled by adding additional boric acid and lime and heating the reactants at the reaction temperatures.

The reaction is essentially complete within one hour, although small improvements in the product $B_2O_3$ analysis may be attained by heating the reaction mixture for up to about 4 hours. When calcium oxide or calcium hydroxide are used as reactants, the reaction occurs as a noticeable exotherm within about 15 to 25 minutes, during which time the majority of the starting materials are converted to the desired product.

Preferably, the reaction mixture is agitated, such as by stirring, during the reaction period. After the reaction is completed, the nobleite product is separated from the hot mother liquor such as by filtration or centrifugation or other suitable mean of solid-liquid separation. The wet solids may be washed, such as with water, to remove any entrained mother liquor, and subsequently dried to provide a crystalline calcium hexaborate tetrahydrate.

If a product with higher $B_2O_3$ content is desired, the calcium borate tetrahydrate can be dehydrated by heating at a temperature of at least about 325° C., preferably in the range of about 450° C. to about 550° C. to produce a novel amorphous, anhydrous calcium hexaborate, $CaO \cdot 3B_2O_3$, which contains about 79% $B_2O_3$.

The production of nobleite by the method of this invention has a number of advantages over the previously known methods. The reaction time is substantially reduced from as long as several weeks at low temperatures, to as short as less than an hour at the temperatures of this invention. Also, the high concentration of reactants provides a higher yield of product per unit volume of the reaction mixture. Substantially pure nobleite can be produced under the preferred conditions of this invention, while under the conditions outside of this region, nobleite is partially or totally replaced by the formation of gowerite during the reaction.

It has been further discovered that the product of the method of this invention has a unique crystal habit not found in nobleite formed at low concentrations and temperatures. Nobleite, as found in nature and as synthesized at room temperature, is distinguished by a platy morphology. Although it is monoclinic, the platelets have a pseudohexagonal form.

The platelets are commonly found in aggregates that are stacked or arranged sub parallel to the 100 plane. The large thin crystals have been found in sizes up to a centimeter in length and have a hexagonal aspect, while the smaller crystals are more rhombic shaped and may form drusy coatings. See also Erd, McAllister and Vlisidis, *American Mineralogist*, 46, 560–571 (1961). FIG. 1 is a photomicrograph of calcium hexaborate tetrahydrate crystals formed at room temperature, obtained by scanning electron microscopy at a magnification of 5500×.

Although the crystalline form of the calcium hexaborate tetrahydrate produced by the process of this invention is also composed of platelets, the crystal habit or arrangement of these platelets is very distinctive and unique. Individual thin platelets, are arranged in nearly spherical radial clusters. FIG. 2 is a photomicrograph of the crystalline product of this invention obtained by scanning electron microscopy at a magnification of 3000× and shows the unique crystal habit of the product produced according to the method of this invention.

Particle size analysis of the crystalline product of this invention indicates a relatively small mean particle size distribution, typically of about 90% less than 75 micrometers in diameter. This small mean particle diameter is advantageous for many applications where a fine dispersion of the solids is required, such as for fire retardant applications in polymeric resins. Yet it is easy to filter, facilitating the separation of the solid product from the mother liquor, which then can be recycled back into the process. Further, the spherical shape of the crystal habit results in excellent handling and flow properties of the dried solids despite the extremely fine particle size distribution. It was also found that the crystalline product does not have a significant tendency toward caking.

The product dehydrates in three distinct stages, losing water at about 91°, 177° and 312° C. It was found to melt at a temperature of about 927° C. The anhydrous calcium borate product produced by dehydration of the product is less hygroscopic than most dehydrated metal borate compounds.

EXAMPLES

The following examples illustrate the novel methods and compositions of this invention.

Example 1

Boric acid (1,448 grams) and 31.7 grams of calcium hydroxide ($Ca(OH)_2$) were combined in 5.00 liters of deionized water in a stirred flask to make up a batch of synthetic mother liquor. This mixture was stirred and heated to 95° C. and two batches, each of 2,089 grams of boric acid and 417 grams of calcium hydroxide, were added over a period of about six minutes to give a final reaction slurry (33% undissolved solids) containing a lime to boric acid ($CaO:H_3BO_3$) molar ratio of 0.13:1 and a boric acid to water ($H_3BO_3:H_2O$) molar ratio of 0.33:1. There was a slight drop in temperature after the addition of each batch, followed by a final exotherm which raised the temperature to boiling (101° C.). The resultant reaction mixture was stirred at about 95° to 100° C. for 3 hours and samples of the solid product and liquor were taken for analysis after each hour. The results are shown in Table 1. The reaction slurry was diluted with warm water and filtered to give a filter cake of product which was washed with cold water to remove adhering liquor. The resultant crystalline product was dried and determined to be substantially pure nobleite by X-ray diffraction analysis, titration and thermogravimetric analysis (TGA).

FIG. 2 is a photomicrograph of the crystalline product obtained by scanning electron microscopy at a magnification of 3000×.

TABLE 1

| Reaction Time | Weight % $B_2O_3$ in solids | Weight % CaO in solids | Molar Ratio $CaO/B_2O_3$ in solids | Weight % $B_2O_3$ in liquor | Weight % CaO in liquor |
|---|---|---|---|---|---|
| 1 Hour | 61.69 | 15.90 | 0.320 | 10.82 | 0.29 |
| 2 Hours | 61.84 | 15.94 | 0.320 | 9.08 | 0.24 |
| 3 Hours | 62.11 | 15.96 | 0.319 | 8.90 | 0.24 |
| Theoretical | 62.00 | 16.62 | 0.333 | | |

The crystalline nobleite product had a very fine particle size distribution with more than 90% by weight passing a 200 mesh (74 micrometer) test sieve and 70% by weight passing a 325 mesh (45 micrometer) test sieve. The particle size distribution is shown in Table 2.

TABLE 2

| U.S. Mesh | Opening Size (micrometers) | Weight % Retained | Cum. Weight % Passing |
|---|---|---|---|
| 80 | 180 | 0.93 | 99.07 |
| 100 | 150 | 0.19 | 98.88 |
| 140 | 105 | 1.10 | 97.78 |
| 200 | 75 | 3.82 | 93.96 |
| 325 | 45 | 22.84 | 71.12 |

Examples 2–13

Synthetic mother liquors were prepared by combining boric acid, lime (in the form of calcium hydroxide) and deionized water in a stirred flask. These mixtures were heated to a temperature of 95° C. and additional boric acid and lime were added to the reaction mixtures in up to four batches. The reaction mixtures were stirred at 95° C. for 3 to 4 hours following the final addition of boric acid and lime. At the end of the reaction time the slurry was filtered and washed to recover the solid product. The molar ratios of reactants, namely boric acid:water (BA/Water) and lime:boric acid (CaO/BA), are shown in Table 3 below along with the product $B_2O_3$ analyses and mineralogical results. The mineralogy of the crystalline product was generally determined by X-ray diffraction and microscopy. The nobleite/gowerite ratio was estimated for some of the products from X-ray diffraction data.

TABLE 3

| Example No. | Mole Ratios of Reactants | | Product Analyses | |
|---|---|---|---|---|
| | BA/Water | CaO/BA | % $B_2O_3$ | Mineralogy |
| 2 | 0.43 | 0.09 | 63.3 | Nobleite |
| 3 | 0.33 | 0.13 | 62 | Nobleite |
| 4 | 0.30 | 0.14 | 62.2 | Nobleite + Gowerite (92/8) |
| 5 | 0.30 | 0.14 | 61.4 | Nobleite |
| 6 | 0.23 | 0.11 | 62.1 | Nobleite + Gowerite (94/6) |
| 7 | 0.20 | 0.15 | 59.1 | Nobleite + Gowerite |
| 8 | 0.17 | 0.09 | 59.1 | Gowerite |
| 9 | 0.12 | 0.12 | 59.4 | Nobleite + Gowerite |
| 10 | 0.12 | 0.12 | 58.9 | Gowerite |
| 11 | 0.10 | 0.14 | 58.2 | Gowerite |
| 12 | 0.06 | 0.09 | 58.3 | Gowerite |
| 13 | 0.04 | 0.16 | 41.3 | Sibirskite |

As shown in the Examples of Table 3, substantially pure nobleite, having a high $B_2O_3$ analysis, is produced when the boric acid/water molar ratio is above about 0.25 and the lime/boric acid molar ratio is less than about 0.15. When the boric acid/water ratio is reduced and/or the lime/boric acid ratio is increased, the boric oxide content of the product decreases and the nobleite product is replaced by gowerite.

Examples 14–17

The following reactions were carrier out using calcium carbonate as the source of lime.

Example 14 was carrier out by a procedure similar to Example 1 above, wherein a synthetic mother liquor was made by mixing boric acid, calcium carbonate and deionized water in a stirred flask and after heating to 95° C. additional boric acid and calcium carbonate were added.

In examples 15–17 deionized water and calcium carbonate were combined and, after heating to 95° C., boric acid was added. Substantial foaming of the reaction mixtures was observed as a result of $CO_2$ gas released by the reaction of the boric acid and calcium carbonate. This resulted in a drop in temperature from 95° C. to about 63–66° C. The reaction mixtures were reheated to 95° C. within 15 to 20 minutes.

The reaction mixtures were stirred continuously and the temperatures controlled at about 95° C. for about 3 to 3.5 hours after the final reagent additions. At the end of the reaction period the slurries were filtered and the solids washed to remove entrained solution. The mole ratios of the reactants and the chemical and mineralogical analyses of the solid products are summarized in Table 4.

TABLE 4

| Example No. | Mole Ratio of Reactants | | Product Analyses | |
|---|---|---|---|---|
| | BA/Water | CaO/BA | % $B_2O_3$ | Mineralogy |
| 14 | 0.33 | 0.13 | 62.2 | Nobleite |
| 15 | 0.33 | 0.16 | 60.5 | Nobleite |
| 16 | 0.33 | 0.13 | 62.3 | Nobleite |
| 17 | 0.24 | 0.21 | 55.6 | Nobleite + Calcite |

Example 15

(Comparative)

Boric acid (40 grams) and 8 grams of hydrated lime were added to 200 grams of water to give a reaction mixture containing a boric acid to water molar ratio of 0.06:1 and a lime to boric acid molar ratio of 0.17:1. The mixture was stirred initially and then allowed to sit at room temperature (approximately 22° C.) over a seven day period. The resulting solid product was recovered and determined to be nobleite by X-ray diffraction analysis. FIG. 1, a photomicrograph of the crystalline product obtained by scanning electron microscopy at a magnification of 5500×, shows the product as consisting of stacked aggregates of hexagonal platelets.

The above example shows that while synthetic nobleite can be formed at low ratios of boric acid to water at low temperatures, long reaction times are required. Further, the crystal habit of the resultant product is more like that described for natural nobleite than the spherical radial clusters obtained by the process of the present invention as illustrated in Example 1.

Example 19

A 5.9 kilogram sample of synthetic nobleite containing product from Examples 1, 3 and 5 was distributed into several stainless steel pans and heated in an oven at 500° C. for about 17 hours. The residual water content of the dehydrated product was determined to be less than 0.5% by weight by thermogravimetric analysis. This product was observed to have the same free-flowing properties characteristic of the nobleite product prior to dehydration. This is attributed to the particle form or habit which was confirmed by scanning electron microscopy to resemble the crystal habit of the hydrate prior to dehydration except that there are generally some openings of the radial platelets making up the spherical radial clusters. Despite this characteristic particle form or habit which is residual from the crystalline form existing prior to dehydration, X-ray diffraction analysis indicated that the dehydrated product is essentially amorphous.

Various changes and modifications of the invention can be made and, such variations incorporate the spirit of this invention, they are intended to be included within the scope of the appended claims.

What is claimed is:

1. The method of producing crystalline calcium hexaborate tetrahydrate which comprises reacting boric acid and lime in an aqueous slurry, at a temperature in the range of from about 85° to about 105° C., wherein the molar ratio of boric acid to water is in the range of from about 0.25 to 0.5:1 and the molar ratio of lime to boric acid is in the range of about 0.05 to about 0.15:1, and separating said crystalline calcium hexaborate tetrahydrate from said aqueous slurry.

2. The method according to claim 1, wherein said molar ratio of boric acid to water is in the range of from about 0.3 to about 0.45:1.

3. The method according to claim 1, wherein said molar ratio of lime to boric acid is in the range of from about 0.1 to about 0.13:1.

4. The method according to claim 1, wherein said temperature is in the range of from about 95° to about 101° C.

5. The method according to claim 1, wherein said lime is calcium carbonate.

6. The method according to claim 1, wherein said lime is hydrated lime.

7. The method according to claim 1, wherein the resultant aqueous product slurry contains at least 25% by weight undissolved solids.

8. The method according to claim 7, wherein said aqueous product slurry contains at least 30% by weight undissolved solids.

9. The method of producing crystalline calcium hexaborate tetrahydrate which comprises reacting boric acid and lime in an aqueous slurry, at a temperature in the range of from about 95° to about 101° C., wherein the molar ratio of boric acid to water is in the range of from about 0.3 to about 0.45:1, and the molar ratio of lime to boric acid is in the range of from about 0.1 to about 0.13:1, and separating said crystalline calcium hexaborate tetrahydrate from said slurry.

10. The method according to claim 9, wherein the resultant aqueous product slurry contains at least 25% by weight undissolved solids.

11. The method according to claim 10, wherein said aqueous product slurry contains at least 30% by weight undissolved solids.

12. Crystalline calcium hexaborate tetrahydrate consisting of thin, intergrown platelets, arranged in nearly spherical radial cluster, produced according to the method of claim 1.

13. The method of dehydrating a crystalline calcium hexaborate tetrahydrate composition produced according to claim 1 wherein said composition is heated at a temperature above about 325° C.

14. The method according to claim 13 wherein said temperature is in the range of from about 450° C. to about 550° C.

15. An amorphous calcium hexaborate composition produced according to the process of claim 13 having a pseudomorphology consisting of thin, intergrown platelets, arranged in nearly spherical radial clusters.

* * * * *